United States Patent [19]

Schenk

[11] 4,166,309
[45] Sep. 4, 1979

[54] VARIABLE HEIGHT RECEPTACLE

[75] Inventor: Peter Schenk, West Islip, N.Y.

[73] Assignee: Dzus Fastener Co., Inc., West Islip, N.Y.

[21] Appl. No.: 930,351

[22] Filed: Aug. 2, 1978

Related U.S. Application Data

[63] Continuation of Ser. No. 780,310, Mar. 23, 1977, abandoned.

[51] Int. Cl.² .............................................. A44B 21/00
[52] U.S. Cl. ................................ 24/221 R; 85/32 CS
[58] Field of Search ............ 24/221 R, 221 A, 221 K; 85/32 CS; 151/41.7

[56] References Cited

U.S. PATENT DOCUMENTS

| 2,443,309 | 6/1948 | Dzus | 24/221 A |
| 2,839,808 | 6/1958 | Zahodiakin | 24/221 K |
| 3,121,453 | 2/1964 | Modrey | 85/32 CS |

FOREIGN PATENT DOCUMENTS 465623  6/1950  Canada ................................. 24/221 A Primary Examiner—Kenneth J. Dorner
Attorney, Agent, or Firm—Kane, Dalsimer, Kane, Sullivan & Kurucz

[57] ABSTRACT

A variable height receptacle adapted to be mounted on one of two members to be fastened and to be removably coupled with a stud mounted on the other of two members to be fastened. The receptacle includes a tubular housing having an opening on at least one end to the interior thereof and surfaces thereon for attachment to the one member. The housing has a threaded surface thereon and a spring is positioned in the housing in engagement with the threaded surface in position to be shifted along the threaded surfaces by relative rotation between the spring and housing thereby providing a variable height receptacle. One of the spring and a stud coupled with the other member has a spiral cam slot and the other of the spring and stud has a cam follower so that relative rotation therebetween with the spring shifted to a predetermined height in the housing will shift the stud and spring between the fastened and unfastened positions.

6 Claims, 5 Drawing Figures

VARIABLE HEIGHT RECEPTACLE

This is a continuation of application Ser. No. 780,310, filed Mar. 23, 1977, now abandoned.

BACKGROUND OF THE INVENTION

Quick release fasteners, particularly of the quarter turn type, are in common use in many environments today. In the typical quarter turn fastener the elements of the fastener generally include a stud and a receptacle. Relative rotation of about one quarter turn therebetween will accomplish the fastening and unfastening actions. The receptacle and stud are both of predetermined configuration and size. The stud and receptacle are designed for use with particularly sized pair of elements which are being fastened and are generally not adjustable. Naturally there is a slight tolerance afforded for normal tolerances in construction of the elements being fastened.

However, in many environments the thickness of elements or panels can be easily or closely controlled. This is particularly true where large size panels are provided and where the thickness of the panel is not a critical dimension and therefore the tolerance standard is looser. Thus, the size of the large, mass produced panels varies to a large degree. Accordingly, when large numbers of fasteners are employed to fasten these large panels together, if the dimensional thickness of the panels vary considerably, the fasteners will often not work since they are not provided with an adjustable size. Alternatively, a number of different sizes of fasteners must be provided to accommodate dimensional differences. This naturally adds to the cost of the installation both in view of the variety of different size fasteners which are required and the necessity to try different fasteners for the particular panel thickness in order to find one that will work.

Therefore, it is readily apparent that there is room in the fastener art for a quarter turn type fastener which can be quickly and efficiently mounted to the panels and which will accommodate a wider variation in panel thickness without the necessity of having to use different size fasteners for different panel thicknesses at different locations. It would be extremely helpful if the receptacle of the fastener assembly could be designed with a variable height adjustment ability built in so that the receptacle can be adjusted when it is initially coupled with the stud in fastening two panels together and thereafter be retained at that size or height for continued use at the location at which it is mounted. With that capability, studs which will fit that type of receptacle can be interchanged for use with the receptacle at the location where it is mounted.

SUMMARY OF THE INVENTION

With the above background in mind, it is among the primary objectives of the present invention to provide a receptacle which is useful in areas where the thickness of the members being fastened varies to a degree where known conventional non-adjustable quarter turn receptacles will not suffice. It is contemplated that the present fastener will allow the use of a receptacle and a stud for a substantial element thickness variation within a given environment.

It is an objective to provide a receptacle supplied with a spring in a minimum height position for maximum grip specifications. The receptacle is designed so that a single stud length is used and the height of the receptacle adjusted for the panel thickness after installation. In this manner, after installation the receptacle, the insertion of the stud through the panels and into the receptacle permits turning until the required tension is obtained between the stud and receptacle to hold the panels in fastened condition. This automatically sets the height of the receptacle spring and from then on this height is maintained with normal quarter turn operation as the stud is fastened and unfastened during use.

Thus, it is an objective to provide an adjustable assembly including a stud and a receptacle for an environment where panel thickness vary to a considerable extent. Furthermore, since the studs are of the same length and the receptacle is the adjustable member, studs become interchangeable.

It is also contemplated that should the panel dimensions be altered with respect to the panel to which the receptacle is fastened or to the panel to which the stud is to be coupled, readjustment of the receptacle is possible independent of the stud by use of an appropriate tool returning the height of the receptacle to the maximum thickness position whereupon recoupling with the stud and rotation will readjust the receptacle for the new panel thickness. The readjusted receptacle will then operate in the same manner as prior to adjustment with quarter turn fastening and unfastening action and the desired tension being present to hold the panels or members being fastened.

In summary, a variable height receptacle is provided which is adapted to be mounted on one of two members to be fastened and to be removably coupled with a stud mounted on the other of two members to be fastened. The receptacle includes a tubular housing having an opening on at least one end to the interior thereof and surfaces thereon for attachment to the one member. A receiving surface is on the housing. A spring is in the housing in engagement with the receiving surface in position to be shifted along the receiving surface by relative movement between the spring and housing thereby providing a variable height receptacle. One of the spring and a stud coupled with the other member has a spiral cam slot and the other of the spring and stud has a cam follower so that relative movement therebetween with the spring shifted to a predetermined height in the housing will shift the stud and spring between the fastened and unfastened positions.

With the above objectives among others in mind, reference is made to the attached drawings.

DESCRIPTION OF THE PREFERRED EMBODIMENT

Figure 1:
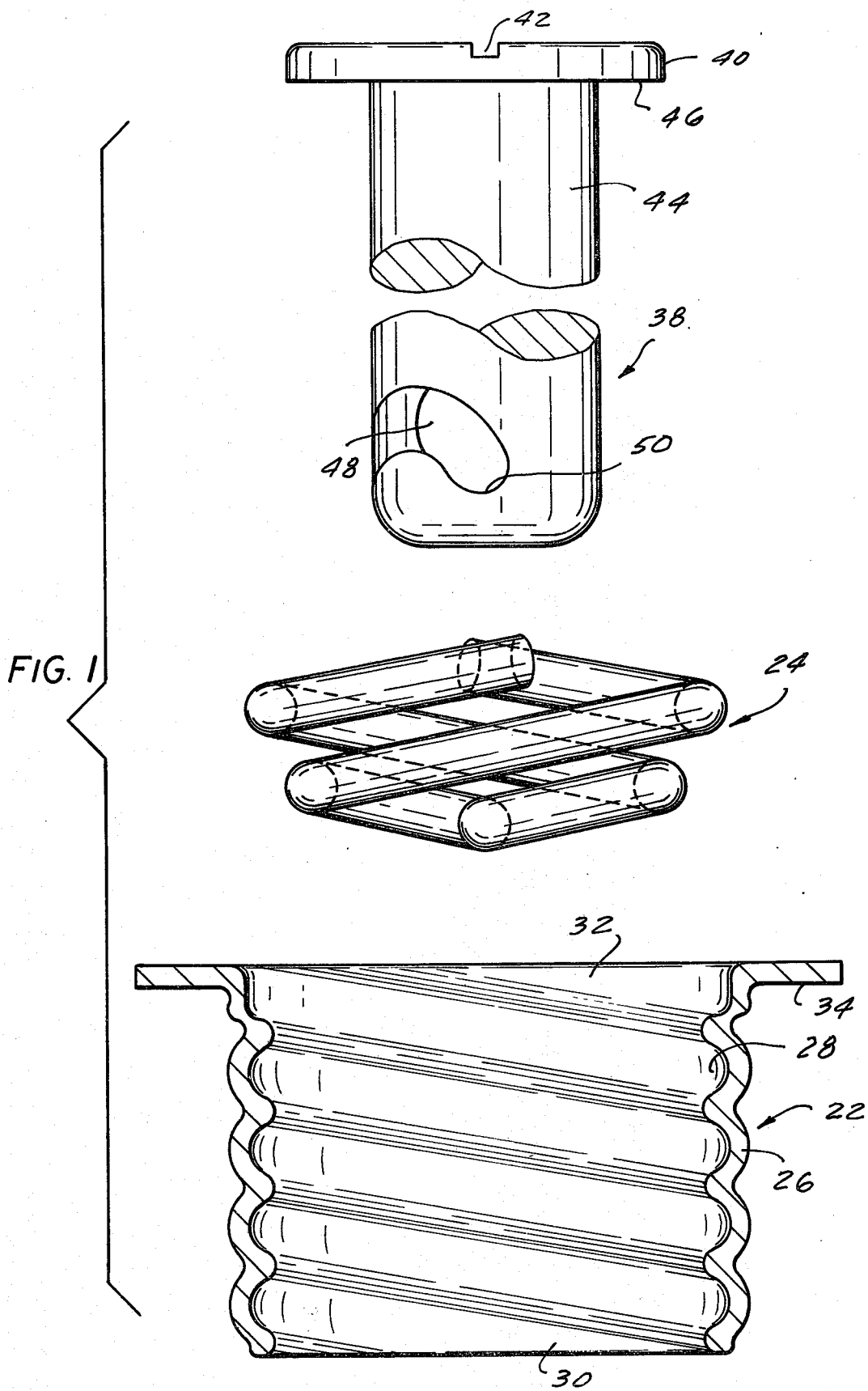
FIG. 1 is an exploded view of the receptacle of the invention showing the housing in cross section and a fragmentary portion of a stud to be coupled therewith.

Variable height receptacle 20 includes two components, a housing 22 and a spring 24. Housing 22 is generally tubular in configuration with the tubular body portion 26 being formed with a threaded inner surface 28, an opening 30 at one end and an opening 32 at the other end. Surrounding the edge of opening 30 at the one end of tubular body 26 is a lateral flange 34.

Spring 24 is a double wound spring of resilient material with one portion thereof formed into a horizontal diametrically extending bar portion 36 which serves to form an engagement surface for the spring for purposes of adjusting the height of the spring with respect to the tubular housing and to form a cam follower with spring action for engagement with a stud. The outer diameter of the coils of spring 24 is slightly larger than the inner diameter of threaded surface 28 on the inside of tubular body portion 26 of the housing. Therefore when spring 24 is inserted into the housing it is compresed slightly so that it is under compression in position in engagement with threaded surface 28 and will frictionally engage with the side walls of the housing and tend to maintain its relative fixed position with respect to axial movement. Naturally sufficient force to rotate spring 24 will permit its axial movement as it travels along the corresponding threads 28 on housing 22.

Spring 24 with cross bar 26 forming a cam follower and providing spring action as a cam follower is designed for coupling with a conventional stud 38. The stud has an enlarged head portion 40 with a slot 42 therein for engagement by a tood for rotation of the stud between the coupling and uncoupling positions. The head is connected to a body portion 44 of lesser diameter thereby forming an undersurface 46 on the head for engagement with a member being fastened.

At the end of body portion 44 distal from the head 40 is a spiral cam slot 48 of a predetermined length. It is conventional to provide a length for cam slot 48 so that a quarter turn of stud 38 with respect to cam follower 36 will shift the stud and receptacle between the fastened and unfastened positions. The spiral cam slot terminates in a detent 50 in which the resilient bar 36 seats and provides the tension force to hold the stud to the receptacle.

Figure 2:
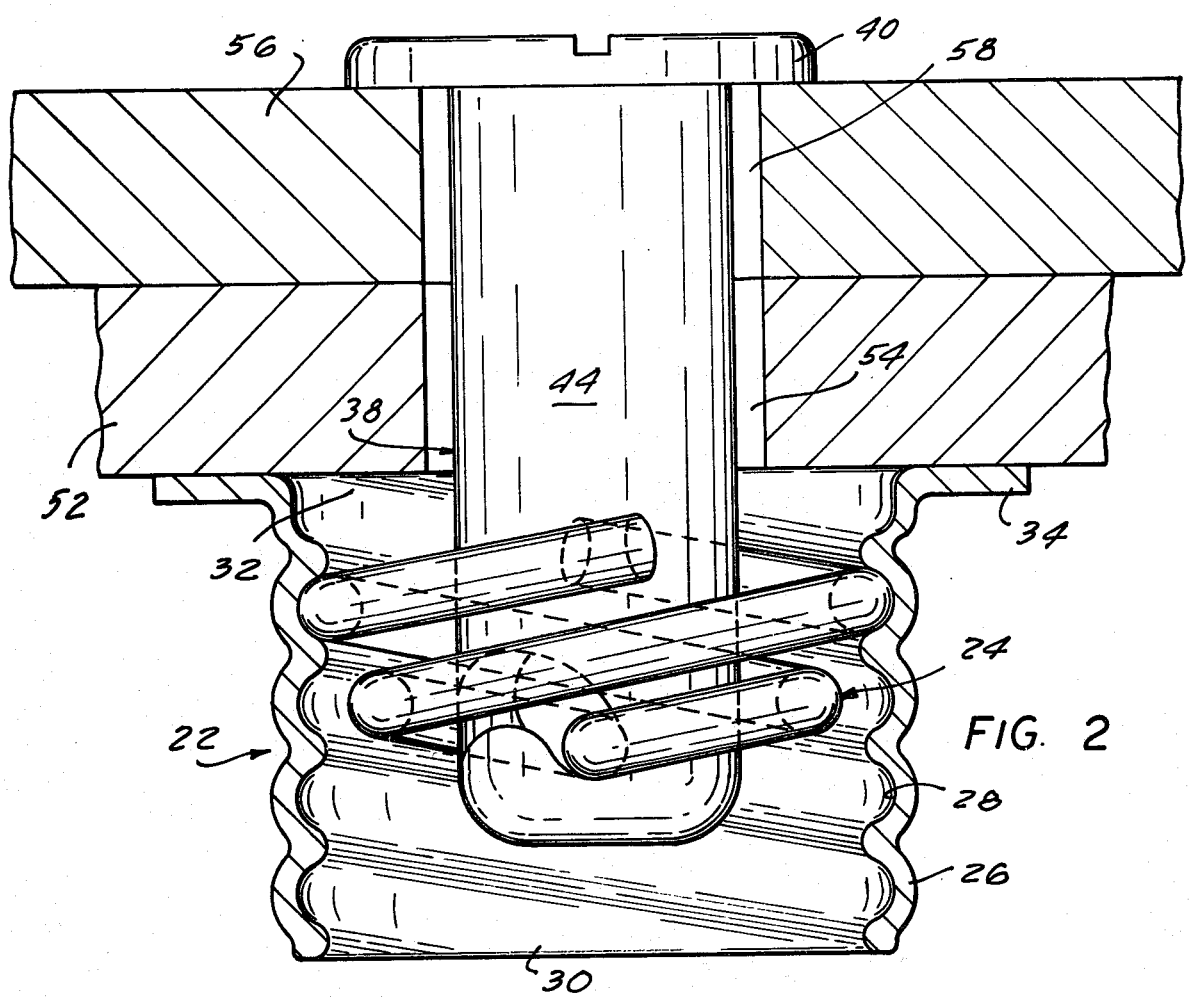
FIG. 2 is a sectional side elevation view of the receptacle mounted on one of two thick panel members and coupled with a stud to hold the members together.
Figure 4:
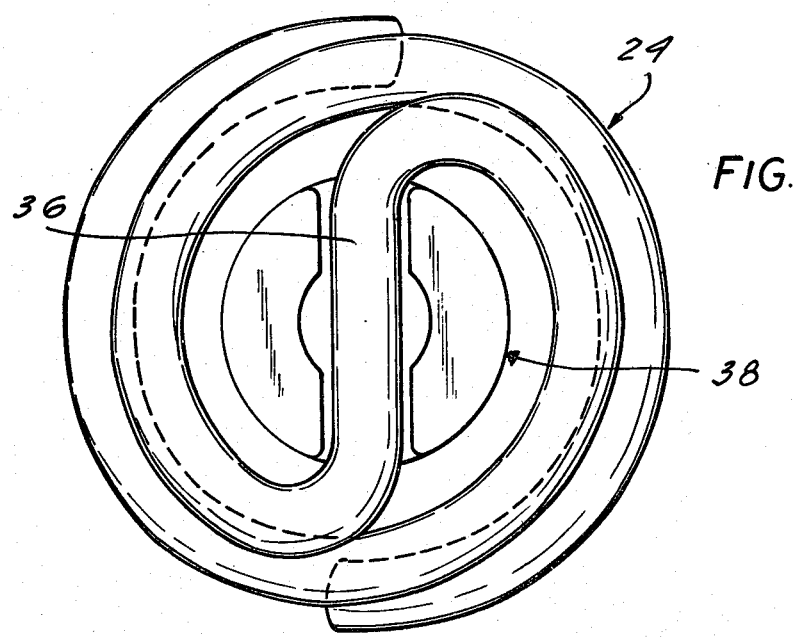
FIG. 4 is a bottom plan view of the invention showing the stud in alignment for coupling with the receptacle.

FIGS. 2 and 4 show two different thickness panel arrangements to slow the manner in which the receptacle 22 is adjustable in height so as to accommodate a conventional stud 38 to hold either of the two arrangements of panels together.

In the embodiment of FIG. 2, receptacle 22 with spring 24 in position in tubular body 26 adjacent to open end 32 is mounted in a conventional manner to relatively thick panel 52. This can be accomplished by welding flange 34 or to the undersurface of member 52. Naturally alternatively, the receptacle can be mounted in any other conventional fashion such as by screws or rivets. Member 52 is provided with an aperture 54 therein which is aligned with opening 32 in receptacle 34 when it is mounted in position on member 52. The second thick member 56 to be fastened to member 52 also has an aperture 58 therein which is in position for alignment with aperture 54. Conventional stud 38 is inserted through apertures 58, 54 and opening 32 in the housing until undersurface 46 of head 40 engages with the adjacent surface of member 56. Due to the large thickness of panels 56 and 52, with spring 24 in the upper position as depicted, very little adjustment of the height of the receptacle is probably required. Accordingly rotation of the stud 42 by use of an appropriate tool in slot 42 and rotation thereof will cause cam follower bar 36 to follow slot 48 into locking detent 59 thus fastening members 52 and 56 together in tight interengagement. The spring is restrained from moving due to its frictional engagement under compression with the threaded surface 28 of tube 26. The length of spring 24 and the number of windings is a matter of choice with the greater number of windings providing the greater holding force between the spring and the housing.

Figure 3:
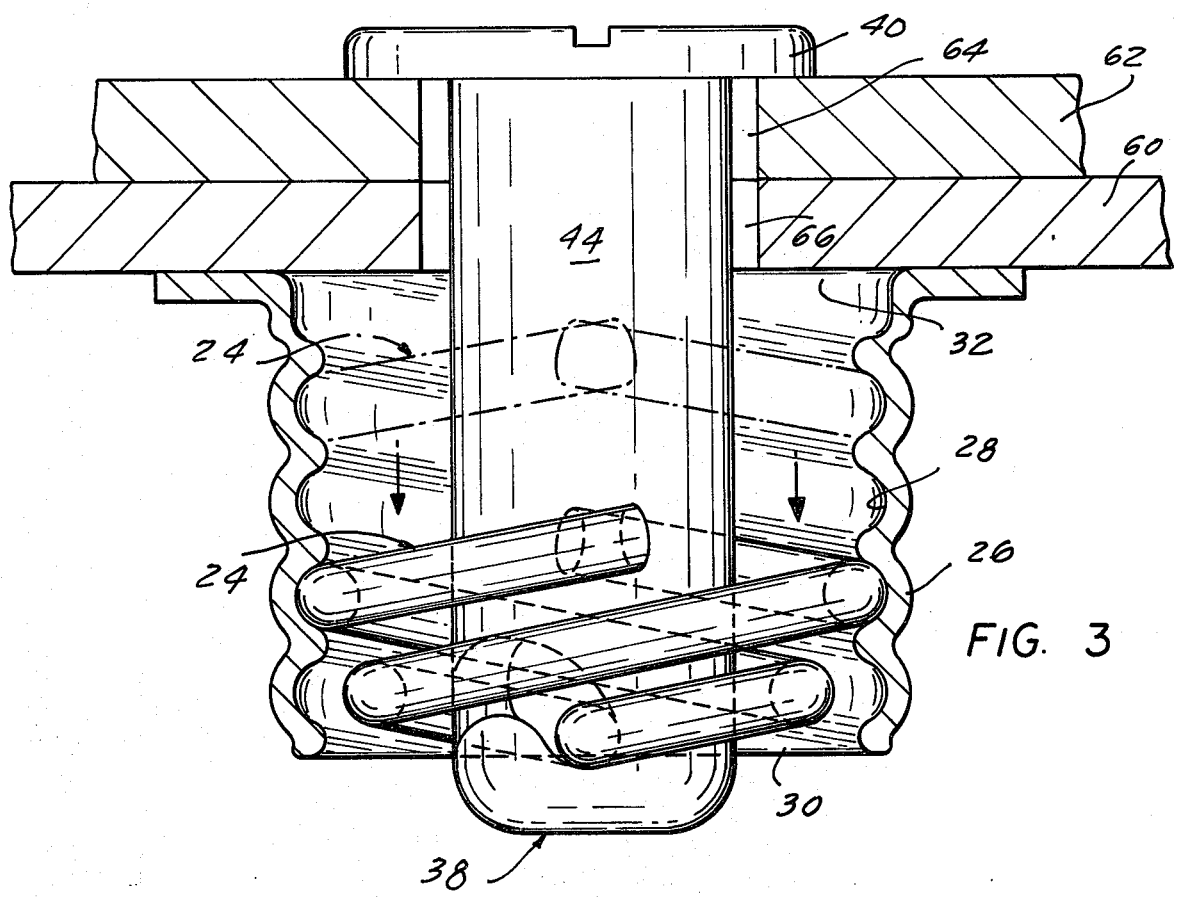
FIG. 3 is a sectional side elevation view of the receptacle of the invention shown coupled with a stud holding two thinner members together with the receptacle adjusted in height from the position shown in phantom to accommodate the change in thickness.
Figure 5:
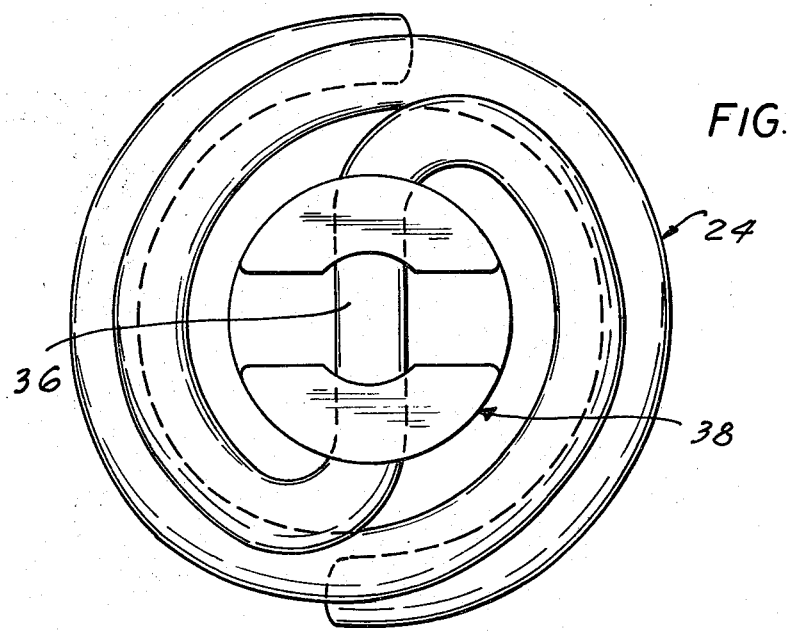
FIG. 5 is a bottom plan view of the invention showing a stud in non-alignment for coupling.

Turning to consideration of the arrangement shown in FIG. 3, two relatively thin panels 60 and 62 are to be fastened and the same receptacle 22 and the same stud 38 can be employed for the fastening action. Flange 34 is mounted to one side of panel 60 in the same manner as the receptacle as mounted to panel 52. Stud 38 is extended through aligned apertures 64 and 66 in panels 62 and 60 respectively and into engagement with resilient diametrically extending cross bar cam follower 36. However, due to the reduced thickness of the panels 60 and 62, it is necessary to rotate the stud and thus rotate the spring 24 relative to the mounted receptacle. This causes spring 24 to thread downwardly within the receptacle from the starting position shown in phantom thereby adjusting the height of the receptacle. When the spring has been rotated sufficiently to cause the necessary tension for tight interengagement between the stud and receptacle and the two thinner panels 62 and 60 the resultant tension will cause resilient follower 36 to be tightly seated in detent 50 at the end of spiral cam slot 48. At this point, the receptacle has been automatically adjusted in height to accommodate for the difference in panel thickness and the stud can then be rotated in a conventional fashion approximately a quarter turn to unfasten the assembly and when desired to fasten the assembly once again.

Should it be desirable to dismount the receptacle from panel 60 and use it with a thicker panel arrangement such as panels 52 and 56, it is possible to extend an appropriate tool into housing 22 and rotate the spring in the opposite direction so as to thread the spring toward opening 32 along the threaded surface 28 back toward the position depicted in FIG. 2 and in phantom in FIG. 3. A separate tool is used for rotation in this direction since the slot in the stud will only rotate the spring in one direction and rotation in the other direction will merely uncouple the stud from the spring.

The variable height receptacle is designed as stated above for accommodation of various thickness panels and it is contemplated that the receptacle and stud arrangement can be inexpensively mass produced of inexpensive materials for mass use at a low cost. The housing can be molded or machined and can be formed of a conventional metal or plastic. For example, it can be formed of cadmium of zinc plated steel with the spring being formed of a more resilient steel material such as a conventional well known music wire.

Thus the several aforementioned objects and advantages are most effectively attained. Although several somewhat preferred embodiments have been disclosed and described in detail herein, it should be understood that this invention is in no sense limited thereby and its scope is to be determined by that of the appended claims.

I claim:

1. A variable height receptacle adapted to be mounted on one of two members to be fastened and to be removably coupled with a stud mounted on the other of the two members to be fastened comprising:

a tubular housing having an opening in at least one end and a threaded inner surface and surfaces thereon for attachment to the one member;

a double wound spring in the housing in engagement with the threaded surface whereupon relative rotation between the spring and the housing will shift the spring along the threaded surface;

the double wound spring having been wound from a single strand of material bent into a U-shape forming a cross member at one end of the U-shape with two prongs one extending from each end of the cross member portion and the prong having been thereafter wound around a mandrel in the same direction into coils intertwined with one another;

the cross member portion of the spring forming a diametrically extending resilient bar to provide a cam follower for engagement with a spiral cam slot on a stud coupled with the other member to be fastened whereupon relative movement therebetween with the spring having been preshifted along the threaded surface in the housing to a predetermined position will shift the stud and spring between the fastened and unfastened positions;

the spring being under partial compression in position in the threaded housing so that it exerts an outward force on the housing which facilitates frictional engagement between the spring and housing and assists in retaining the spring in position in the housing;

the spring being wound so that engagement with the bar and rotation in one direction will tend to compress the spring inward to facilitate mounting of the spring in the housing whereupon release thereof will cause the spring to tend to expand and engage the housing under partial compression and rotation of the spring in the other direction will tend to expand the spring into tighter frictional interengagement with the housing when mounted therein to assist in retaining the spring in position in the housing; and the spring enabled to be first positioned in the tubular housing so that engagement with the stud and rotation thereof will rotate the spring and shift the spring to a second position in which the spring is fastened with the stud whereupon further rotation in the fastening direction is prevented by tight interengagement between the receptacle, stud and two members being fastened but rotation in the unfastening direction is permitted to free the stud from the spring and permit unfastening of the two members.

2. The invention in accordance with claim 1 wherein a lateral flange extends from one end of the tubular housing and is adapted to be mounted to a member to be fastened.

3. The invention in accordance with claim 1 wherein the stud is formed with an enlarged head portion and a reduced diameter body portion adapted to be inserted through an aperture in the other member to be fastened with the underside of the head engaging the adjacent surface of the other member, the one member to be fastened having an aperture therein in alignment with the opening to the receptacle mounted to one side thereof with the aligned apertures in the housing and the one member adapted to be positioned in alignment with the aperture in the other member so that the stud can be passed through the aligned apertures and coupled and uncoupled with the receptacle.

4. The invention in accordance with claim 3 wherein the stud head is formed with a slot to receive a tool for rotation of the stud between the fastened and unfastened positions.

5. The invention in accordance with claim 1 wherein the receptacle and stud are formed of metal material.

6. The invention in accordance with claim 2 wherein the flange of the receptacle is welded to one side of the one member to be fastened thereby positioning the receptacle in alignment with an aperture in the one member for receipt of the stud into communication therewith for fastening and unfastening of two members together.

* * * * *